United States Patent
Sébire et al.

(10) Patent No.: US 7,936,715 B2
(45) Date of Patent: May 3, 2011

(54) METHOD AND A DEVICE FOR RECONFIGURATION IN A WIRELESS SYSTEM

(75) Inventors: Benoist Sébire, Beijing (CN); Harri Jokinen, Hiisi (FI)

(73) Assignee: Nokia Corporation, Espoo (FI)

(*) Notice: Subject to any disclaimer, the term of this patent is extended or adjusted under 35 U.S.C. 154(b) by 636 days.

(21) Appl. No.: 10/574,989

(22) PCT Filed: Oct. 6, 2003

(86) PCT No.: PCT/FI03/00732
§ 371 (c)(1),
(2), (4) Date: Jan. 16, 2007

(87) PCT Pub. No.: WO2005/034559
PCT Pub. Date: Apr. 14, 2005

(65) Prior Publication Data
US 2007/0213035 A1 Sep. 13, 2007

(51) Int. Cl.
*H04W 4/00* (2009.01)

(52) U.S. Cl. ........ 370/329; 370/230; 370/252; 370/341; 370/431

(58) Field of Classification Search .............. 714/790, 714/748, 786; 370/349, 498, 537, 280, 395, 370/331, 338, 328, 329, 469, 342, 345, 230, 370/431, 252, 310; 455/414.1, 403
See application file for complete search history.

(56) References Cited

U.S. PATENT DOCUMENTS

| | | | | |
|---|---|---|---|---|
| 6,473,442 B1* | 10/2002 | Lundsjo et al. | | 370/537 |
| 7,103,020 B2* | 9/2006 | Eriksson et al. | | 370/328 |
| 7,408,904 B2* | 8/2008 | Terry | | 370/337 |
| 7,480,261 B2* | 1/2009 | Speight | | 370/280 |
| 2002/0093922 A1 | 7/2002 | Grilli et al. | | |
| 2002/0128035 A1* | 9/2002 | Jokinen et al. | | 455/552 |
| 2002/0145994 A1 | 10/2002 | Mortensen | | |
| 2002/0167969 A1* | 11/2002 | Eriksson et al. | | 370/469 |

(Continued)

FOREIGN PATENT DOCUMENTS

EP 1 300 976 4/2003

(Continued)

OTHER PUBLICATIONS

"Flexible layer one for the GSM/EDGE radio access network (GERAN)" by B. Sebrie, Telecommunications, 2003, ITC 2003; 10$^{th}$ International Conference, Feb. 23-Mar. 1, 2003, pp. 310-316.

(Continued)

*Primary Examiner* — Huy Phan
*Assistant Examiner* — Kuo Woo

(57) ABSTRACT

A method and a device for reconfiguration in a wireless system utilizing flexible layer one (FLO). In proposed solution one TFC (Transport Format Combination) is selected and reserved (504) exclusively for signalling use. The TFC may contain only one active transport channel and always utilize the same CRC and transport block size in order to unambiguously define the proper settings for signalling. Considering uplink transmission in a wireless system and special case of TFCI (Transport Format Combination Identifier) size change due to the TFCS (Transport Format Combination Set) reconfiguration that also generates a need to switch to a new dedicated basic physical subchannel (DBPSCH); whenever the network notices that the mobile station does not switch to the new DBPSCH (518), it concludes that the TFCS reconfiguration message sent was lost and stays with the existing configuration (520). Otherwise the new configuration is taken into use (514).

18 Claims, 5 Drawing Sheets

U.S. PATENT DOCUMENTS

2003/0007580 A1 1/2003 Nagata et al.
2005/0068894 A1* 3/2005 Yu et al. .................. 370/235

FOREIGN PATENT DOCUMENTS

| EP | 1 335 506 | 8/2003 |
| EP | 1 343 302 | 9/2003 |
| GB | 2 384 654 | 7/2003 |
| WO | 00/28760 | 5/2000 |
| WO | WO 00/70785 | 11/2000 |
| WO | WO 01/17283 | 3/2001 |
| WO | WO 01/31956 | 5/2001 |
| WO | WO 02/32016 | 4/2002 |
| WO | WO 03/017523 | 2/2003 |

OTHER PUBLICATIONS

3GPPTR 45.902 v.6.2.0 (Aug. 2003) $3^{rd}$ Generation Partnership Project; Technical Specification Group GSM/EDGE; Radio Access Network; Flexible Layer One (Release 6).
Japanese Office Action issued Sep. 26, 2008 (3 pages) and English-language translation thereof (4 pages), 7 pages total.

* cited by examiner

METHOD AND A DEVICE FOR RECONFIGURATION IN A WIRELESS SYSTEM

CROSS-REFERENCE TO RELATED APPLICATION

This application is the U.S. National Stage of International Application Number PCT/FI2003/000732 filed Oct. 6, 2003 and published in English on Apr. 14, 2005 as International Publication Number WO 2005/034559 A1.

FIELD OF THE INVENTION

The present invention relates generally to communication systems. In particular the invention concerns GERAN (GSM/EDGE Radio Access Network) radio access network and air interface thereof in which a special type of physical layer called flexible layer one (FLO) is utilized.

BACKGROUND OF THE INVENTION

Modern wireless communication systems such as GSM (Global System for mobile communications) and UMTS (Universal Mobile Telecommunications System) are presumed to transfer various types of data over the air interface between the network elements such as a base station and a mobile station (MS). As the general demand for transfer capacity continuously rises due to e.g. new multimedia services coming available, new more efficient techniques have been developed in order to exploit the existing resources to a maximum extent.

A technical report 3GPP 45.902 [1] discloses a concept of flexible layer one, a new physical layer proposed for the GERAN. The ingenuity of the concept relies on the fact that the configuration of the physical layer including e.g. channel coding and interleaving is specified not until the call set-up. Thus, the support of new services can be handled smoothly without having to specify new coding configuration schemes separately in connection with each release.

Development work of the FLO concept has been provided with somewhat strict requirements. FLO should, for example, support multiplexing of parallel data flows on to a basic physical subchannel and provide optimization of spectral efficiency through the support of different interleaving depths, unequal error protection/detection, reduced channel coding rate granularity and support of different (8PSK, GMSK etc) modulations. Moreover, the solution shall be future proof and minimize the overhead introduced by the radio protocol stack.

According to the GERAN Release 5 the MAC sublayer (Layer 2 for FLO) handles the mapping between the logical channels (traffic or control) and the basic physical subchannels introduced in 3GPP TS 45.002 [2].

In UTRAN (UMTS Radio Access Network), the MAC utilizes so-called Transport Channels TrCH for transferring data flows with given QoS's (Quality of Service) over the air interface. As a result, several transport channels, that are configured at call set-up, can be active at the same time and be multiplexed at the physical layer.

Now, by adopting the idea of FLO, aforesaid flexible transport channels can be utilized in GERAN as well. Accordingly, the physical layer of GERAN may offer one or several transport channels to the MAC sublayer. Each of these transport channels can carry one data flow providing a certain Quality of Service (QoS). A number of transport channels can be multiplexed and sent on the same basic physical subchannel at the same time.

The configuration of a transport channel i.e. the number of input bits, channel coding, interleaving etc. is denoted as a Transport Format (TF). Furthermore, a number of different transport formats can be associated to a single transport channel. The configuration of the transport formats is completely controlled by the RAN (Radio Access Network) and signalled to the MS at call set-up. Correct interpretation of the TF is crucial at the receiving end as well as the transport format defines the utilized configuration for decoding of the data. When configuring a transport format, the RAN can, for example, choose between a number of predefined CRC (Cyclic Redundancy Check) lengths and block lengths.

On transport channels, transport blocks (TB) are exchanged between the MAC sublayer and the physical layer on a transmission time interval (TTI) basis. For each TTI a transport format is chosen and indicated through the transport format indicator (TFIN). In other words, the TFIN tells which transport format to use for that particular transport block on that particular TrCH during that particular TTI. When a transport channel is inactive, the transport format with a transport block size of zero (empty transport format) is selected.

Only a limited number of combinations of the transport formats of the different transport channels are allowed. A valid combination is called a Transport Format Combination (TFC). The set of valid TFCs on a basic physical subchannel is called a Transport Format Combination Set (TFCS). The TFCS is signalled through Calculated Transport Format Combinations (CTFC).

In order to decode a received sequence the receiver needs to know the active TFC for the radio packet. This information is transmitted in the Transport Format Combination Identifier (TFCI) field. Aforesaid field is basically a layer 1 header and has the same function as the stealing bits in GSM. Each of the TFC within a TFCS is assigned a unique TFCI value and upon receipt of a radio packet this is the first element to be decoded by the receiver. By exploiting the decoded TFCI value the transport formats for the different transport channels can be determined and the actual decoding can start.

In case of multislot operation, there shall be one FLO instance for each basic physical subchannel. Each FLO instance is configured independently by Layer 3 and gets an own TFCS as a result. The number of allocated basic physical subchannels depends on the multislot capabilities of the MS.

For the time being the use of FLO is planned to be limited to dedicated channels only, thus maintaining the 26-multi-frame structure for which the SACCH shall be treated as a separate logical channel based on GERAN Release 5.

The concept of transport formats and channels as presented in reference [1] is visualized in FIG. 1 where e.g. coded speech is to be transmitted over FLO. Speech is transferred by using three different modes MODE 1, MODE 2, MODE 3 with different bit rates and an additional comfort noise generation mode CNG MODE. Inside a mode the speech bits have been divided into three different classes represented by three transport channels TrCHA 102, TrCHB 104, and TrCHC 106 on the basis of their varying importance during the speech reconstruction stage, for example. Numbers inside the blocks, see e.g. the block pointed by legend 108, being arbitrary in this example though, indicate the required number of bits in a transport channel and codec mode specific manner. Hence, it can be noticed from the figure that TrCHA contains four transport formats (0, 60, 40, 30), TrCHB three transport formats (0, 20, 40) and TrCHC only two formats (0, 20). Resulting transport format combinations TFC1-TFC4, that refer to transport formats on different channels that can be active at the same time, are depicted with dotted lines in the figure. All these valid combinations constitute the TFCS that is signalled through CTFC. An example of CTFC determination is found in reference [1] in addition to techniques applicable in proper TFC selection.

A protocol architecture of FLO in case of Iu mode is depicted in FIG. 2 wherein MAC layer 208 maps either a plurality of logical channels or TBFs (temporary block flows) from RLC entities located in RLC layer 206, said RLC layer 206 receiving data from e.g. PDCP 204 (Packet Data Convergence Protocol) and controlled by RRC (Radio Resource Controller) 202, to physical layer 210. In current specification [1] logical channels are used but are presumably to be replaced with the concept of temporary block flows in the future. The TBF concept is described in reference [3] in more detail. A dedicated channel (DCH) can be used as a transport channel dedicated to one MS in uplink or downlink direction. Three different DCHs have been introduced: CDCH (Control-plane DCH), UDCH (User-plane DCH) and ADCH (Associated DCH), the CDCH and UDCH of which used for transmission of RLC/MAC data transfer blocks, whereas the ADCH targeted for transmission of RLC/MAC control blocks. A mobile station may concurrently have a plurality of transport channels active.

The FLO architecture is illustrated in FIG. 3 especially in relation to Layer 1 for FLO. In this version only a one-step interleaving has been assumed, i.e. all transport channels on one basic physical subchannel have the same interleaving depth. An alternative architecture with two-step interleaving is disclosed in reference [1] for review. Basic error detection is carried out with a cyclic redundancy check. A Transport Block is inputted to error detection 302 that utilizes a selected generator polynomial in order to calculate the checksum to be attached to the block. Next, the updated block called Code Block is fed into a convolutional channel coder 304 introducing additional redundancy to it. In rate matching 306 bits of an Encoded Block are either repeated or punctured. As the block size can vary, also the number of bits on a transport channel may correspondingly fluctuate. Thereupon, bits shall be repeated or punctured in order to keep the overall bit rate in line with the actual allocated bit rate of the corresponding sub-channel. Output from rate matching block 306 is a called a Radio Frame. Transport channel multiplexing 308 takes care of multiplexing of Radio Frames from active transport channels TrCH(i) . . . TrCH(1) received from matching block 306 into a CCTrCH (Coded Composite Transport Channel). In TFCI mapping 310 a TFCI is constructed for the CCTrCH. Size of the TFCI depends on the number of TFCs needed. TFCI size should be minimized in order to avoid unnecessary overhead over the air interface. For example, TFCI of 5 bits can indicate 32 different transport format combinations. If these are not enough, a dynamic connection reconfiguration is needed to be performed. The TFCI is (block) coded and then interleaved 312 with CCTrCH (these two constituting a Radio Packet) on bursts. The selected interleaving technique is configured at call set-up. RRC layer, Layer 3 for FLO, manages set-up, reconfiguration and release of the traffic channels. Upon creating a new connection, Layer 3 indicates to the lower layers various parameters to configure the physical, MAC and RLC layers. Parameters include the transport channel identity (TrCH Id) and transport format set for each transport channel, transport format combination set through CTFC with modulation parameter etc. In addition, Layer 3 provides transport channel specific parameters such as CRC size, rate matching parameters, transport format dynamic attributes etc. The transport channels and the transport format combination set are separately configurable in the uplink and downlink directions.

Notwithstanding many advantageous features the FLO clearly offers to GERAN, some defects still remain in the proposed current version. For example, if a TFCS reconfiguration message is transmitted between a base station and MS but is lost or, at least, not correctly interpreted by the recipient, the subsequent communication may be endangered due to e.g. possible size difference between the previous and the new TFCI. Considering a scenario wherein the network informs the addition/deletion of TFCs in a TFCS reconfiguration message that is eventually lost, and the size of the TFCI is adapted as a result (addition->size increase, deletion->size decrease) at the sender side only, neither the network nor the MS is able to interpret the received data packets anymore due to the TFCIs with a different meaning to the two communication ends concerned. The similar problem arises if the far-end party properly receives the TFCS reconfiguration message but the indicated TFCS is taken into use at the ends of the communication without synchronization. Even if the TFCI size remains the same, different meanings between the old and the just received TFCIs forbids proper communication or at least disturbs it remarkably.

SUMMARY OF THE INVENTION

The object of the present invention is to alleviate the above defect and to provide means to facilitate maintaining a workable signalling connection between the entities at the ends of a communication link utilizing FLO even if, for example, the TFCS reconfiguration has not been correctly received or interpreted by one end of the connection, or if the lack of synchronization in mobilizing the new TFCS has at least temporarily disabled the other data transfer connections. The object is achieved by utilizing a solution in which one TFC is selected and reserved exclusively for signalling use. The TFC may, for example, contain only one active transport channel and always utilize the same CRC (of same type and/or same size) and the same transport block size in order to unambiguously define the proper settings for sending/receiving signalling information. TFCI for the signalling TFC can be selected as 0 for simplicity reasons, for example.

Considering the special case of TFCI size change due to the reconfiguration; if e.g. the network sends a TFCS reconfiguration message indicating the change to a mobile station, it also indicates that a new dedicated basic physical subchannel (DBPSCH) ordered by the network (e.g. in the same message) must be used for further communication with the new configuration. However, if the network notices that the mobile station does not switch to the new DBPSCH, it concludes that the reconfiguration message was probably lost, stays with the existing (old) configuration and, for example, resends said reconfiguration message to the mobile station. On the other hand, if the mobile station switches to the new DBPSCH, the network knows with a reasonable certainty that the reconfiguration message was received and interpreted correctly.

Discussing next about the resulting utility of the invention, although TFCS reconfiguration messages may still get lost, be wrongly interpreted or taken into use without synchronization, at least the signalling information, that is vital for correcting the situation and keeping the overall connection alive, can be received somewhat normally thanks to the commonly specified static TFC (and TFCI) for signalling. In addition, aforesaid DBPSCH monitoring in case of TFCI size change enables the receipt of data by using the old configuration/DBPSCH at the receiving end. Thus, transmitted information is not lost due to the mismatch in utilized configurations between the connection ends.

According to the invention, a method for reconfiguration to be performed in a wireless system utilizing a flexible layer one to transfer data over the air interface thereof, where a number of transport formats indicating configurations of transport channels carrying data flows are included in a transport format combination, the transport format combination belonging to a transport format combination set indicating transport format combinations valid on a certain basic physical subchannel, and where one transport format combination with a certain transport format combination identifier is dedicated exclusively for signalling use, has the steps of transmitting a transport format combination set reconfiguration message to a terminal over said certain basic physical subchannel, said transport format combination set reconfiguration message indicating the one transport format combination with the certain transport format combination identifier exclusively for signalling use; whereby if a change in the size of transport format combination identifiers is indicated by the message, checking a parameter value related to said terminal, on the basis of which either starting to use a new configuration indicated by the message, or staying with the existing configuration.

In another aspect of the invention, a device operable in a wireless system utilizing a flexible layer one to transfer data over the air interface thereof, where a number of transport formats are adapted to indicate configurations of transport channels carrying data flows included in a transport format combination, and the transport format combination is adapted to belong to a transport format combination set indicating transport format combinations valid on a certain basic physical subchannel, the set including one transport format combination with a transport format combination identifier dedicated for exclusively signalling use, said device comprising processing means (602) and memory means (604) configured to process and store instructions and data, and data transfer means (608) configured to transmit data, is arranged to transmit a transport format combination set reconfiguration message to be delivered to a second device over said certain basic physical subchannel, said transport format combination set reconfiguration message indicating the one transport format combination with the transport format combination identifier exclusively for signalling use; whereby if a change in the size of transport format combination identifiers indicated by the message, to check a parameter value related to said second device, on the basis of which either to start to use a new configuration indicated by the message, or to stay with the existing configuration.

The term "TFCS reconfiguration message" refers to such a message including TFCS settings or part thereof directly or to a corresponding information transferred along some other information embedded in a message not exclusively targeted for TFCS reconfiguration purposes.

The term "active transport channel" refers to a transport channel having data bits to be transmitted during a TTI, i.e. a transport channel with a transport format having a transport block size greater than zero.

In one embodiment of the invention, the proposed method for reconfiguration is exploited by a network element. The mobile station utilizes the current TFCS for sending uplink data even after a new TFCS (uplink) configuration with a different TFCI size has been transmitted to it by the network element. Upon noticing that the mobile station still remains on the old DBPSCH, the network element uses the old configuration to decode the received packets and resends the configuration message to the mobile that now receives and decodes it properly.

Various embodiments of the invention Are disclosed below.

BRIEF DESCRIPTION OF THE DRAWINGS

Hereinafter the invention is described in more detail by reference to the attached drawings, wherein FIG. 1 discloses a visualization of a TFCS structure.

DETAILED DESCRIPTION OF EMBODIMENTS OF THE INVENTION

Figure 1:
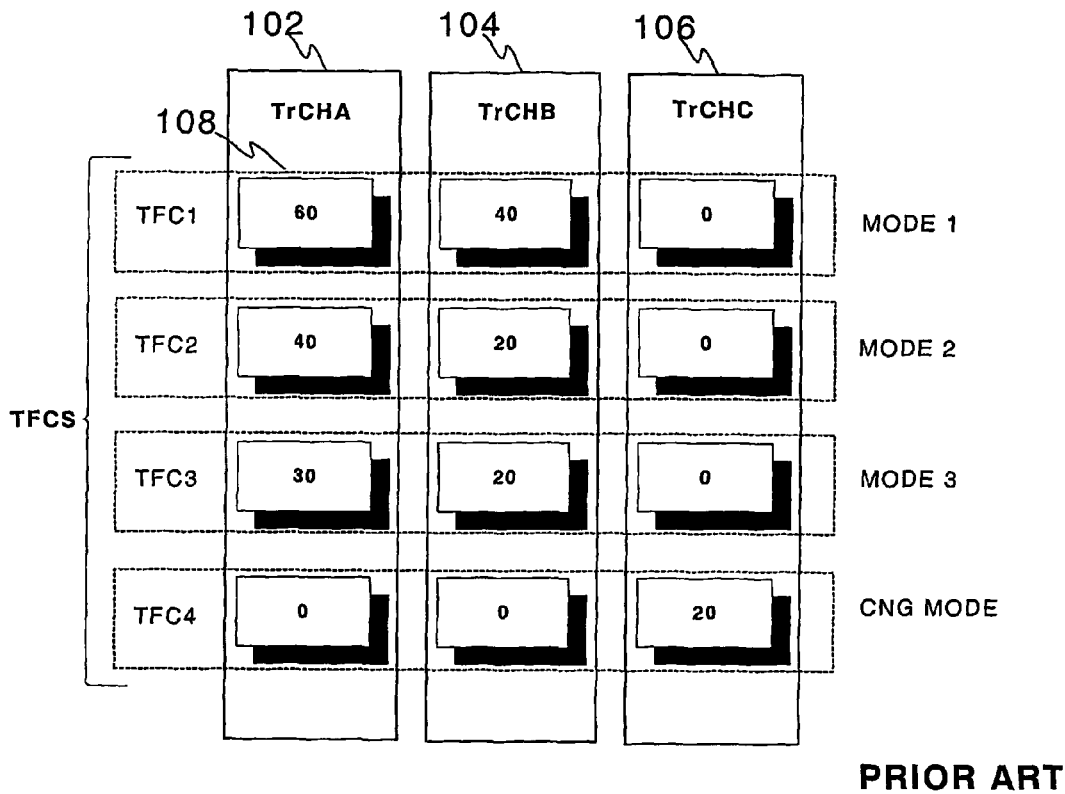
Figure 2:
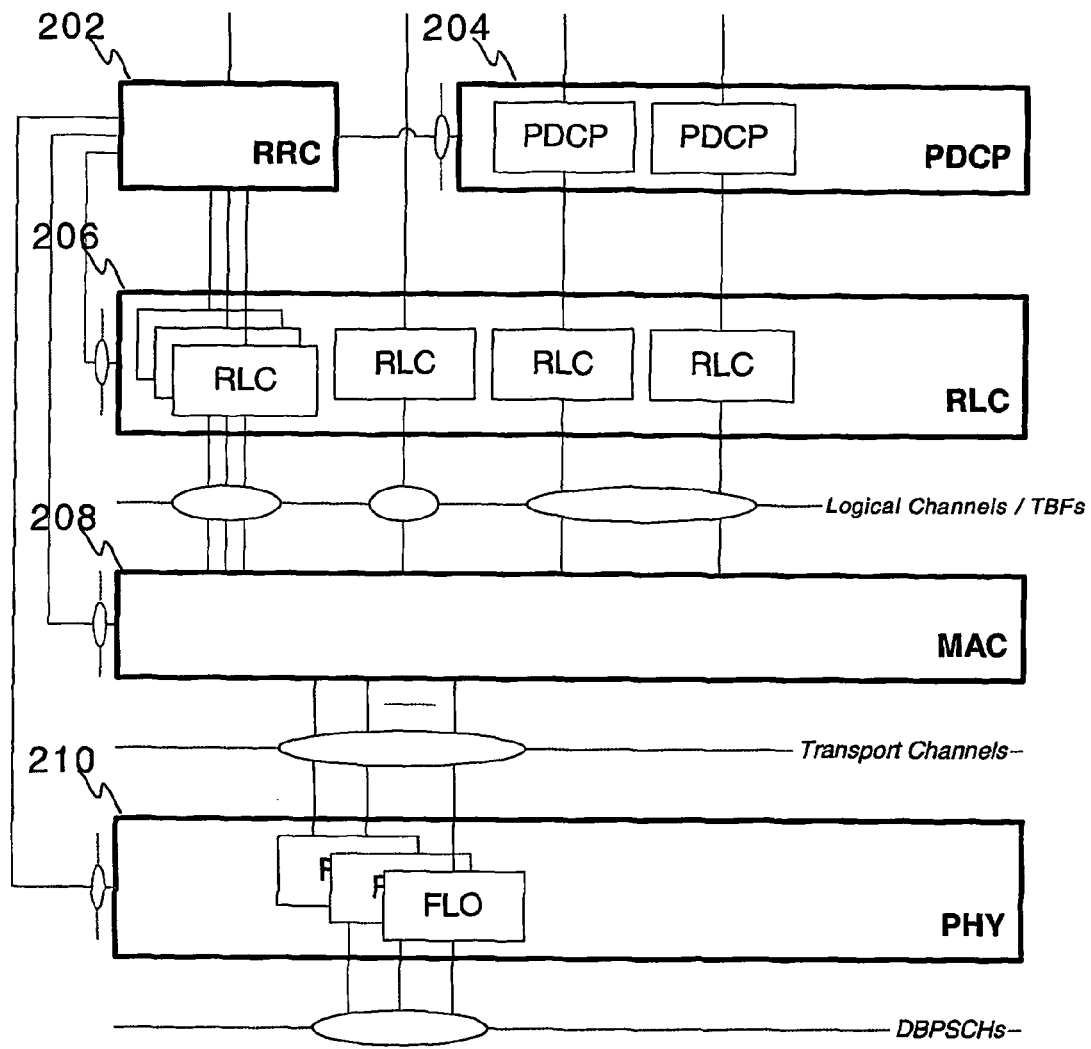
FIG. 2 illustrates FLO protocol architecture in GERAN Iu mode.
Figure 3:
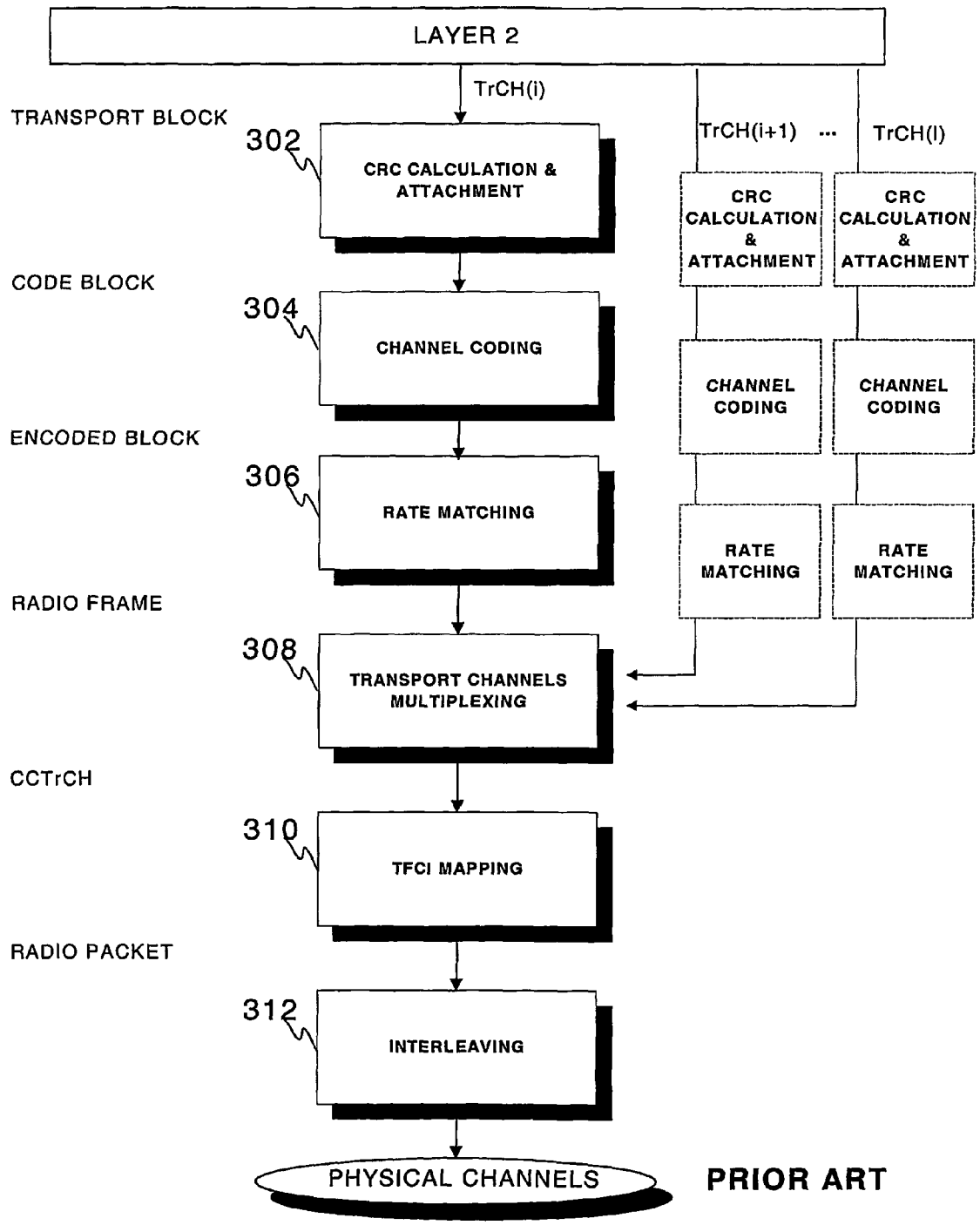
FIG. 3 illustrates FLO architecture.

FIGS. 1, 2, and 3 were already discussed in conjunction with the description of related prior art.

Figure 4:
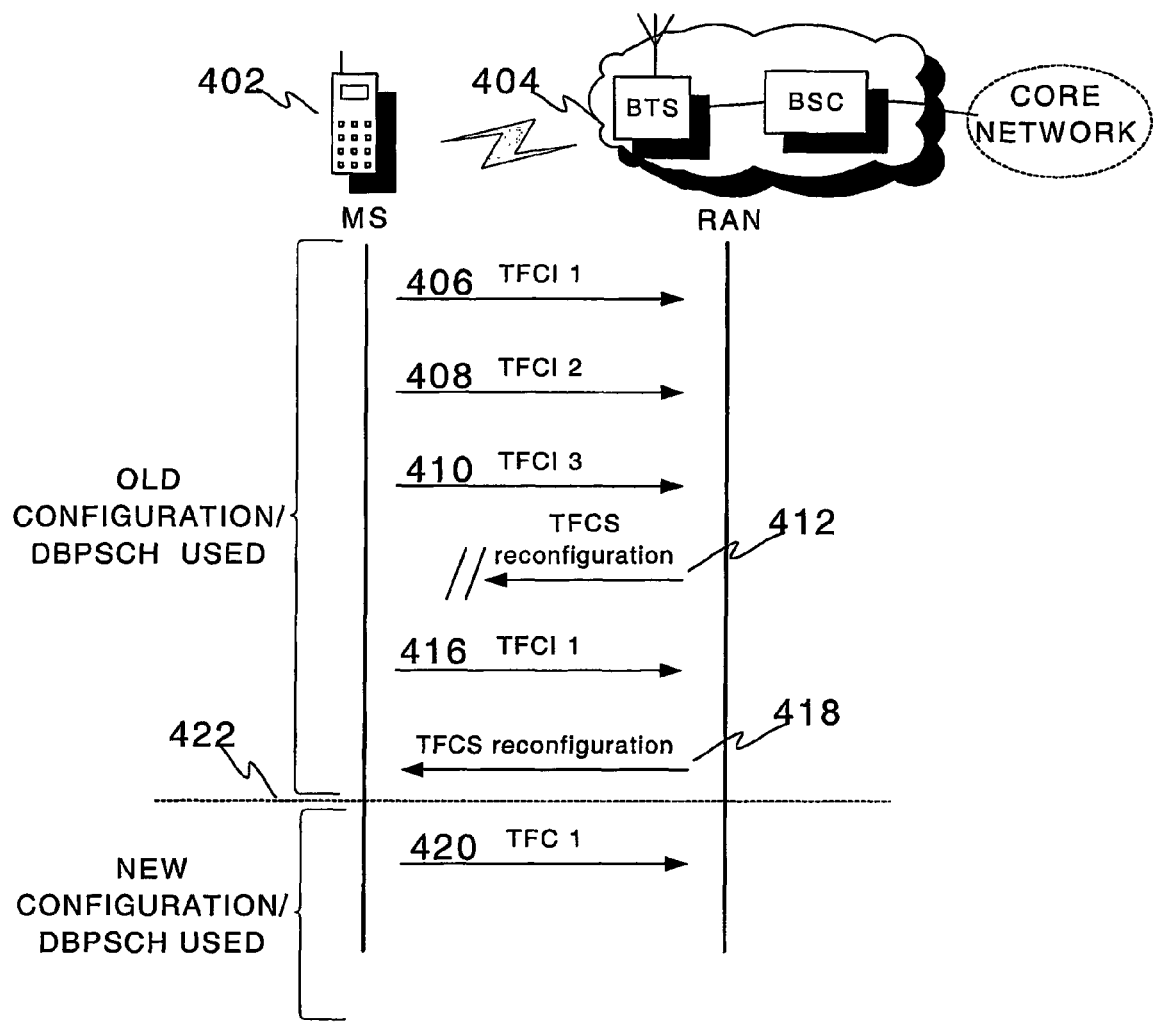
FIG. 4 is a signalling chart of the embodiment of the invention.

FIG. 4 discloses, by way of example only, a signalling chart describing the scenario of the embodiment of the invention in which mobile station 402 utilizes the current TFCS for sending data in uplink direction to radio access network (e.g. GERAN) 404 in radio packets, every such packet including one or more transport blocks (TB) of a certain transport format constituting a TFC of the current TFCS, the TFC signalled in the packet by TFCI. Mobile station transmits three packets: packet 406 with TFCI 1, packet 408 with TFCI 2, and packet 410 with TFCI 3, said packets including a number of transport blocks. Network 404 receives and decodes the packets correctly by utilizing the TFCIs of the current TFCS. Now, however, the TFCS configuration should be updated due to addition/deletion of some transport format combinations. Therefore, network 404 transmits TFCS reconfiguration message 412 to mobile station 402, the message indicating change in the TFCI size thus requiring mobilization of a new DBPSCH ordered by network 404. Unfortunately message 412 actually never reaches its destination because of disturbances in the radio path. Hence, mobile station 402 sends the following radio packet 416 with TFCI 1 to network 404 by still utilizing the old configuration. However, as mobile station 402 does not switch to the new DBPSCH (switching can be monitored by the network by listening to the new DBPSCH), network 404 concludes that TCFS reconfiguration message 412 was not correctly received by mobile station 402 and resends it 418. In addition, network 404 managed to properly decode packet 416 by using the old configuration. Mobile station 402 receives the new configuration data, switches 422 to new DBPSCH and sends radio packet 420 in accordance with the new configuration.

In order to avoid situations wherein the size of the TFCI has to be changed, it is possible to fix the size thereof e.g. to a maximum allowable value such as 5 bits. This approach is not optimal from a link level performance viewpoint whenever less bits are actually required to represent all the valid TFCs on the basic physical subchannel in question.

Considering a further possible scenario in which TFCS reconfiguration message 412 is lost but change in the size of the TFCI and thus switch to a new DBSCH is not required, network 404 still understands signalling information transmitted by mobile station 402 in message 416 if the proposed basic principle of static TFC and TFCI for the signalling data is utilized.

The above principles are not limited to any certain transmission direction or device. They may be used in both uplink and downlink directions and in e.g. a mobile station and a network element (e.g. a base station (BS), a base station controller (BSC), or a combination thereof).

Figure 5:
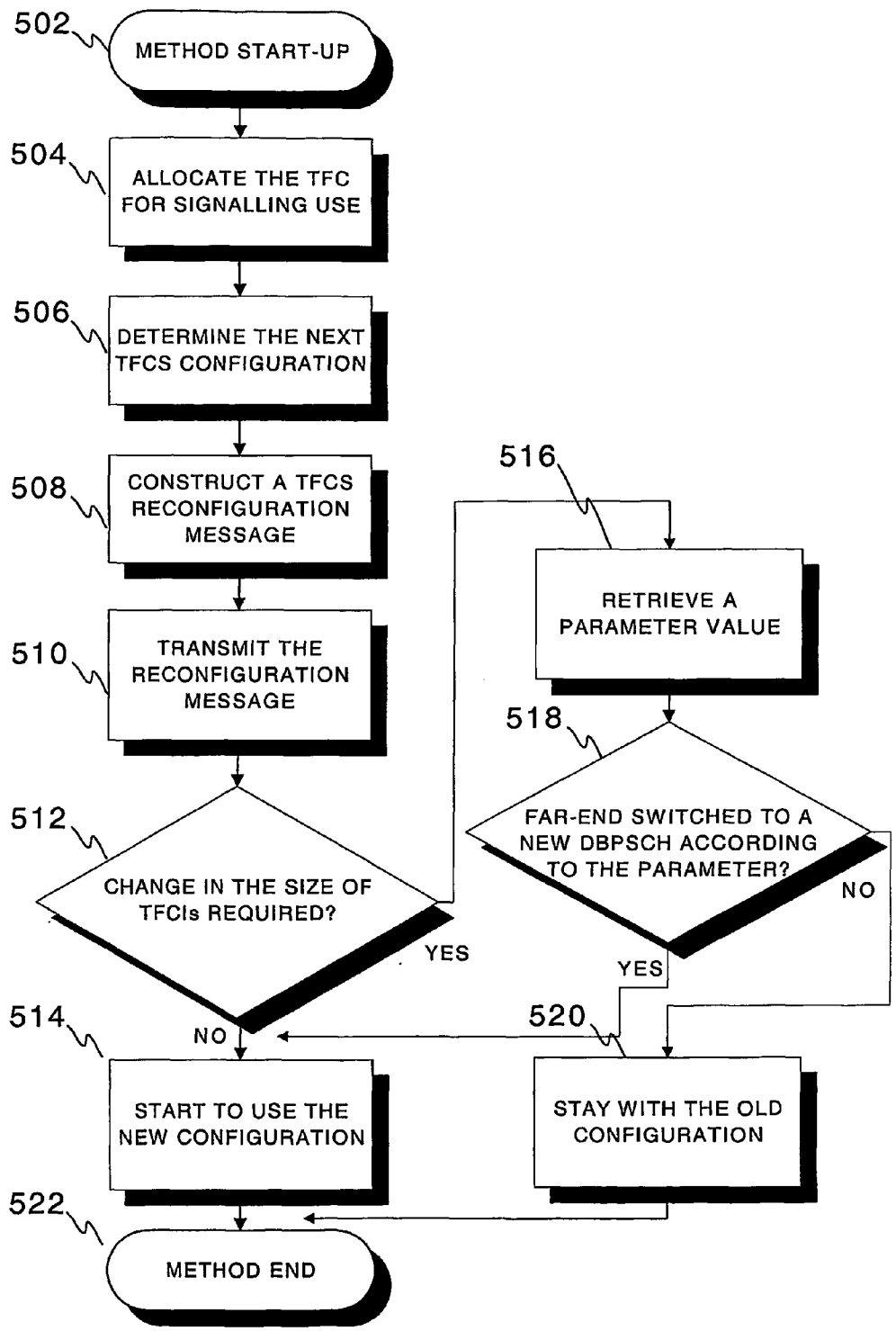
FIG. 5 discloses a flow diagram of the method of the invention.

FIG. 5 discloses a flow diagram of the method of the invention in uplink direction. At method start-up 502 the network entity (e.g. a BS, BSC, or a combination thereof) executing the method may, for example, receive a new TFCS configuration from another network entity to be taken into use with a certain connection. Alternatively, the entity may itself detect a need for a configuration change and create a new TFCS configuration to be mobilized. In phase 504, in accordance with previously mentioned basic principles of the invention, the one and the same TFC identified by a certain TFCI and allocated exclusive for signalling use is re-allocated again for the same purpose in the new TFCS. The signalling TFC has fixed properties as described hereinbefore in order to guarantee successful signalling transmission even if the TFCS configuration message is not properly received by the far-end party of the connection. Then, in phase 506 the rest of the renewed TFCS configuration is determined. A TFCS reconfiguration message is constructed in phase 508 including the CTFC for indicating the new TFCS. Next, the TFCS reconfiguration message is transmitted to a mobile station in phase 510. If a change in the TFCI size is required by the new configuration 512, a parameter indicating e.g. change in the DBPSCH utilized by the mobile station in uplink direction is monitored 516. The mobile station may, for example, inform the network through access bursts about the switch to a new DBPSCH channel. The parameter may then itself be considered as the change of the DBPSCH or just as some other parameter that implicitly indicates the same information to the network. If change of DBPSCH was noticed by the network entity 518, the new configuration may be taken into use in phase 514 as in the case where the size of TFCIs was not altered. Otherwise, the network entity stays with the existing old configuration 520 and may resend the TFCS reconfiguration message. The method is ended in phase 522 and re-started from step 502 whenever TFCS reconfiguration is needed again.

Figure 6:
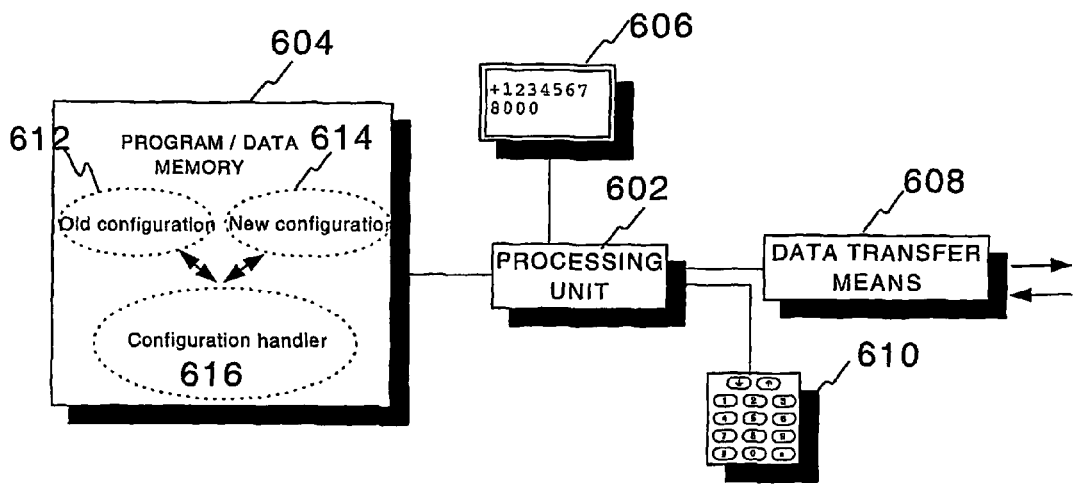
FIG. 6 discloses a block diagram of a device adapted to utilize the invention.

FIG. 6 depicts one option for basic components of a device like a network element (or a combination of separate elements) or a mobile station capable of processing and transferring data in accordance with the invention. Wording "mobile station" refers to, in addition to contemporary cellurar phones, also to more sophisticated multimedia terminals, hand held and laptop computers etc capable of wireless communication. Memory 604, divided between one or more physical memory chips, comprises necessary code 616, e.g. in a form of a computer program/application, and configuration data 612 (old) and 614 (new). Processing unit 602 is required for the actual execution of the method in accordance with instructions 616 stored in memory 604. Display 606 and keypad 610 are optional components often found useful for providing necessary device control and data visualization means (~user interface) to the user of the device. Data transfer means 608, e.g. a fixed data transmission interface or a radio transceiver or both, are required for handling data exchange, for example, receipt of configuration data from other devices and transmission of configuration data to other devices. Code 616 for the execution of the proposed method can be stored and delivered on a carrier medium like a floppy, a CD or a memory card.

The scope of the invention can be found in the following claims. However, utilized devices, method steps, data structures etc may vary significantly depending on the current scenario, still converging to the basic ideas of this invention. For example, it is clear that the invention may be used to control both uplink and downlink transmissions. The mobile station may, in addition to network elements, utilize the method of the invention as well if it really bears the necessary rights for twiddling with the TFCS configurations (uplink, downlink, or both), such rights possibly granted by the network beforehand. Furthermore, a device performing the method of the invention may be implemented as a module (e.g. a chip or circuit arrangement) included in or connected to some other device. Thus the module does not have to contain all the necessary means for completing the overall task of reconfiguration, e.g. a transceiver if the module is to be included in a mobile station, as available external means in the covering or connected device may be used for the desired purposes.

REFERENCES

[1] 3GPP TR 45.902 V.6.2.0 Technical Specification Group GSM/EDGE, Radio Access Network; Flexible Layer One (Rel 6)
[2] 3GPP TS 45.002 V6.3.0 Technical Specification Group GSM/EDGE, Radio Access Network; Multiplexing and multiple access on the radio path (Rel 6)
[3] 3GPP TS 44.160 Technical Specification Group GSM/EDGE, General Packet Radio Service (GPRS); Mobile Station (MS)—Base Station System (BSS) interface; Radio Link Control/Medium Access Control (RLC/MAC) protocol Iu mode (Rel 6)

The invention claimed is:

1. A method for reconfiguration to be performed in a wireless system utilizing a flexible layer one to transfer data over an air interface, said method comprising transmitting a transport format combination set reconfiguration message to a terminal over a certain basic physical subchannel, said transport format combination set reconfiguration message indicating one transport format combination with a certain transport format combination identifier exclusively for signalling use and the transport format combination relating to exactly one active transport channel with a predetermined block size and cyclic redundancy check size, the method further comprising
when the transport format combination set reconfiguration message indicates a change in the size of transport format combination identifiers, checking a parameter value indicating a change of a basic physical subchannel utilized by the terminal and ordered by a network, and
starting to use a new configuration indicated by the transport format combination set reconfiguration message that indicates the change in the size of transport format combination identifications, otherwise staying with the existing configuration as a result of the checking.

2. A method of claim 1, wherein said parameter is the change of a basic physical subchannel utilized by the terminal and ordered by the network.

3. A method of claim 1, wherein said certain identifier is valued zero.

4. A method of claim 1, wherein said wireless system utilizes a GSM/EDGE radio access network.

5. A method of claim 1, wherein the one transport format combination with the certain transport format combination identifier indicated by the transport format combination set reconfiguration message is independent of the other transport format combinations indicated by the message.

6. A method of claim 1, wherein the size of transport format combination identifiers is fixed.

7. A method of claim 6, wherein the size is fixed to a maximum allowable size.

8. A non-transitory computer readable medium embodying a computer program comprising code to perform the method of claim 1.

9. An apparatus, comprising: at least one processor; and at least one memory including computer program code, the at least one memory and the computer program code configured to, with the at least one processor, cause the apparatus at least to: to transmit a transport format combination set reconfiguration message to be delivered to a second device over a certain basic physical subchannel, said transport format combination set reconfiguration message indicating one transport format combination with a certain transport format combination identifier exclusively for signalling use and the transport format combination relating to exactly one active transport channel with a predetermined block size and cyclic redundancy check size, check a parameter value indicating a change of a basic physical subchannel utilized by the second device and ordered by the apparatus, when the transport format combination set reconfiguration message indicates a change in the size of transport format combination identifiers, and start to use a new configuration indicated by the transport format combination set reconfiguration message that indicates the change in the size of transport format combination identifications, otherwise stay with the existing configuration as a result of the check.

10. The apparatus of claim 9 that is a base station, a base station controller, a combination of a base station and a base station controller, or a mobile station.

11. The apparatus of claim 9, wherein said device is a base station.

12. The apparatus of claim 9 that is operable in a GSM/EDGE radio access network.

13. A method for reconfiguration in a wireless system utilizing a flexible layer one to transfer data over an air interface, said method comprising receiving a transport format combination set reconfiguration message over a certain basic physical subchannel, said transport format combination set reconfiguration message indicating one transport format combination with a certain transport format combination identifier exclusively for signalling use and the transport format combination relating to exactly one active transport channel with a predetermined block size and cyclic redundancy check size, and utilizing a parameter indicating a change of a basic physical subchannel ordered by a network, and the receiving of the transport format combination set reconfiguration message, when the transport format combination set reconfiguration message indicates a change in the size of transport format combination identifiers.

14. A method of claim 13, wherein said parameter is the change of a basic physical subchannel utilized by the terminal and ordered by the network.

15. An apparatus, comprising: at least one processor; and at least one memory including computer program code, the at least one memory and the computer program code configured to, with the at least one processor, cause the apparatus at least to: a data transfer unit configured to receive a transport format combination set reconfiguration message over a certain basic physical subchannel, said transport format combination set reconfiguration message indicating one transport format combination with a certain transport format combination identifier exclusively for signalling use and the transport format combination relating to exactly one active transport channel with a predetermined block size and cyclic redundancy check size, and utilize a parameter indicating a change of a basic physical subchannel ordered by a network, and receipt of the transport format combination set reconfiguration message, when the transport format combination set reconfiguration message indicates a change in the size of transport format combination identifiers.

16. The apparatus of claim 15, wherein said apparatus is a base station or a mobile station.

17. The apparatus of claim 15 that is operable in a GSM/EDGE radio access network.

18. A non-transitory computer readable medium embodying a computer program comprising code to perform the method of claim 13.

* * * * *

UNITED STATES PATENT AND TRADEMARK OFFICE
CERTIFICATE OF CORRECTION

| | | |
|---|---|---|
| PATENT NO. | : 7,936,715 B2 | Page 1 of 1 |
| APPLICATION NO. | : 10/574989 | |
| DATED | : May 3, 2011 | |
| INVENTOR(S) | : Benoist Sébire et al. | |

It is certified that error appears in the above-identified patent and that said Letters Patent is hereby corrected as shown below:

At column 10, line 21 (claim 15, line 5), cancel the words "a data transfer unit configured to" so that claim 15 should read as follows:

15. An apparatus, comprising:

at least one processor; and at least one memory including computer program code, the at least one memory and the computer program code configured to, with the at least one processor, cause the apparatus at least to:

receive a transport format combination set reconfiguration message over a certain basic physical subchannel, said transport format combination set reconfiguration message indicating one transport format combination with a certain transport format combination identifier exclusively for signaling use and the transport format combination relating to exactly one active transport channel with a predetermined block size and cyclic redundancy check size, and utilize a parameter indicating a change of a basic physical subchannel ordered by a network, and receipt of the transport format combination set reconfiguration message, when the transport format combination set reconfiguration message indicates a change in the size of transport format combination identifiers.

Signed and Sealed this
Twenty-sixth Day of July, 2011

David J. Kappos
*Director of the United States Patent and Trademark Office*